No. 894,473. PATENTED JULY 28, 1908
R. SYMMONDS, Jr.
POWER CHANGING MECHANISM.
APPLICATION FILED DEC. 14, 1905.
2 SHEETS—SHEET 2.
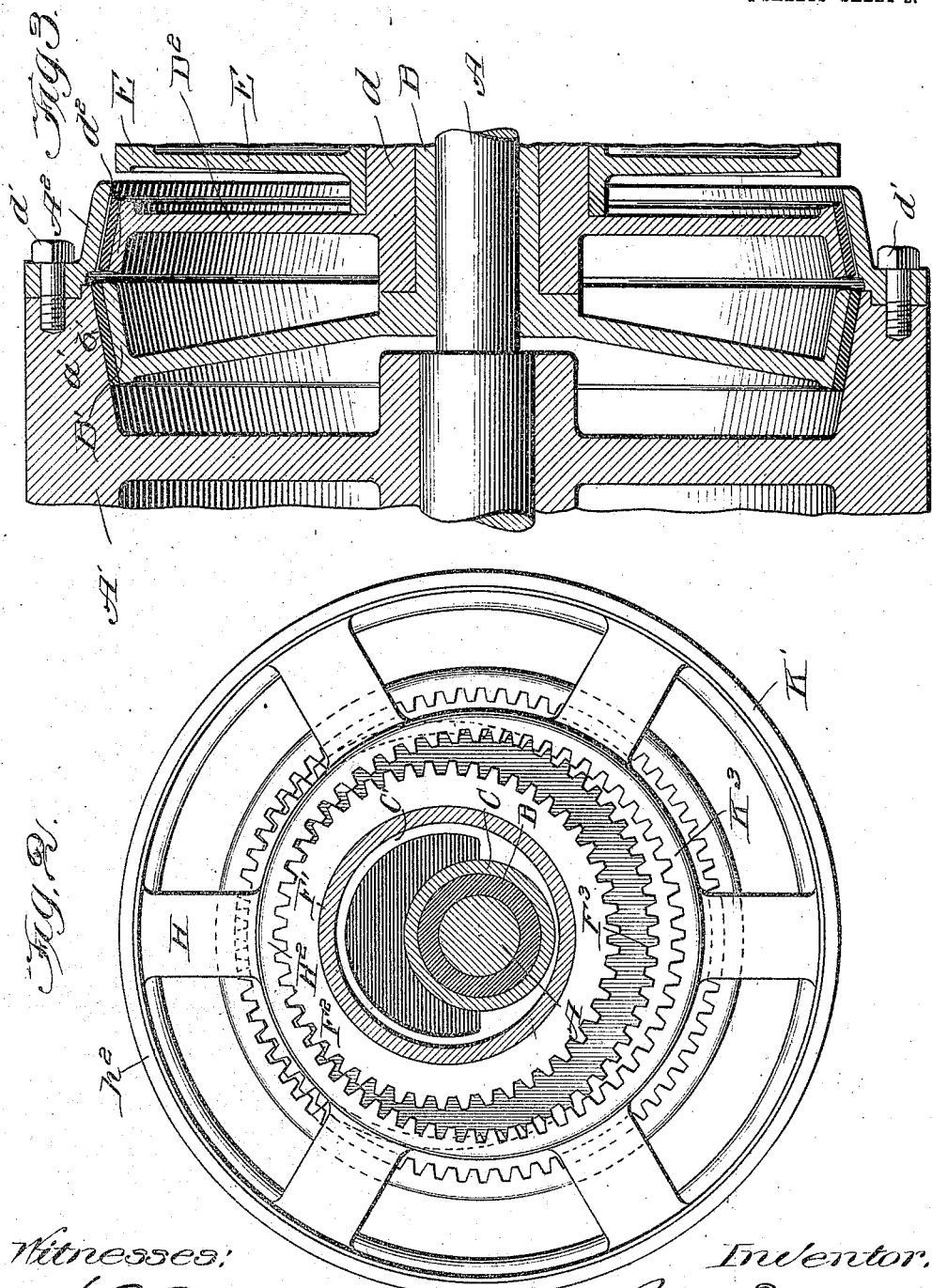

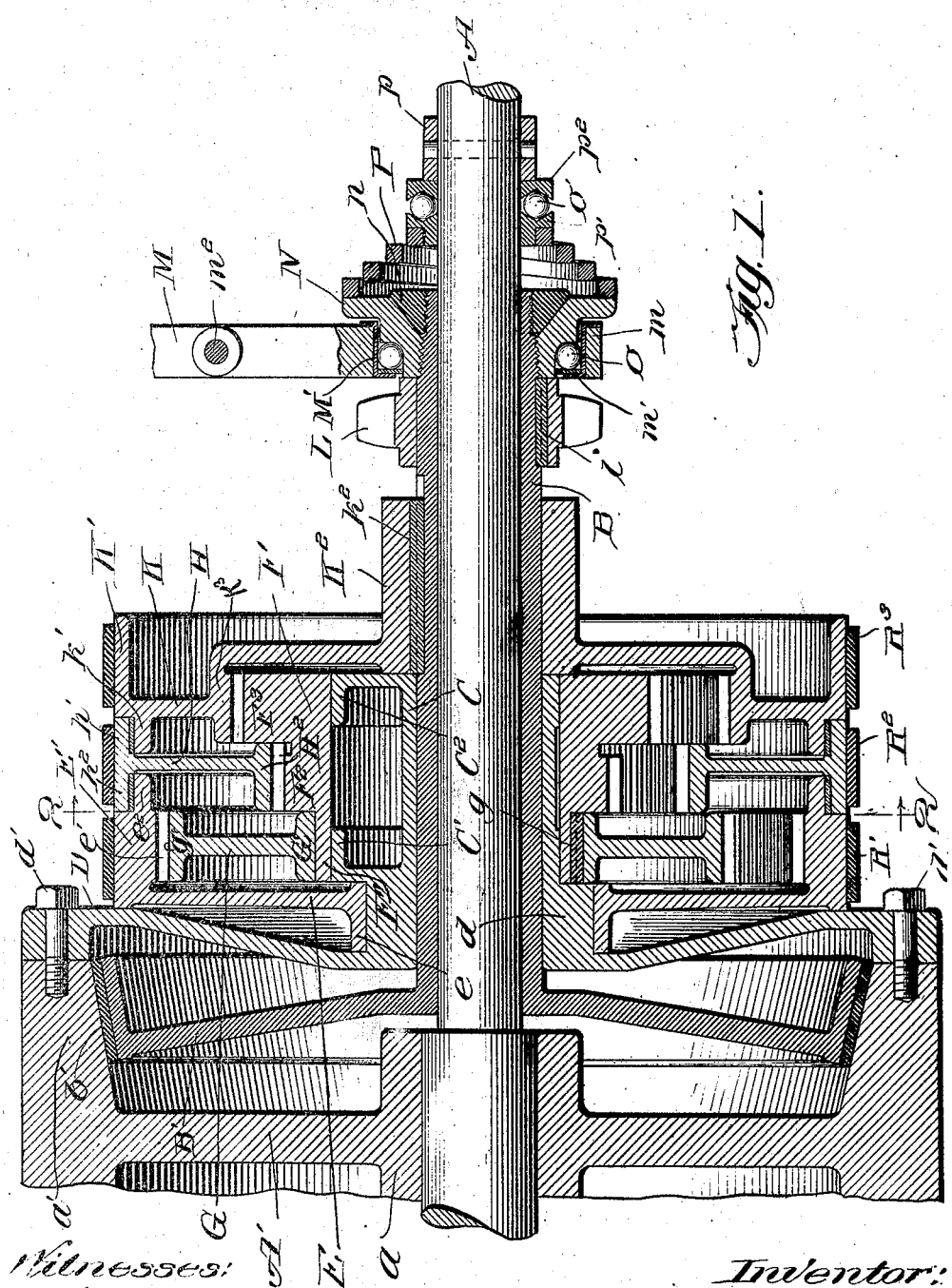

UNITED STATES PATENT OFFICE.

ROBERT SYMMONDS, JR., OF KENOSHA, WISCONSIN, ASSIGNOR TO THOMAS B. JEFFERY, OF KENOSHA, WISCONSIN.

POWER-CHANGING MECHANISM.

No. 894,473.

Specification of Letters Patent.     Patented July 28, 1908.

Application filed December 14, 1905. Serial No. 291,697.

*To all whom it may concern:*

Be it known that I, ROBERT SYMMONDS, Jr., a citizen of the United States, residing at Kenosha, county of Kenosha, State of Wisconsin, have invented a certain new and useful Improvement in Power-Changing Mechanism, and declare the following to be a full, clear, and exact description of the same, such as will enable others skilled in the art to which it pertains to make and use the same, reference being had to the accompanying drawings, which form a part of this specification.

My invention relates in general to power changing mechanism, and more particularly to differential gearing interposed between a motor and a driven element whereby the latter may be rotated at various speeds in one direction, or in a reverse direction.

It is desirable, especially in automobiles, to so connect the motor with a driven element, which in turn is operatively connected to the rear axle of the automobile, that the speed and power transmitted from the motor may be varied at the will of the operator, and that the direction of rotation of the driven element may be reversed while the motor continues to run in the same direction.

The primary object of my invention is to provide power changing mechanism for connecting a motor to a driven element, which may be readily adjusted to inversely vary the speed and power of rotation of the element or to reverse the direction of rotation thereof.

A further object of my invention is to provide a power changing mechanism which will be simple in construction, inexpensive in manufacture, and efficient in operation.

My invention, generally described, consists in a shaft rotatively connected to a motor, a fly wheel fixed upon the shaft and having fixed thereon one member of a pair of clutches, an axially movable clutch member loosely surrounding the shaft and coöperating with said fixed clutch member, a sleeve constituting a driven element loosely supported upon the shaft and rigidly connected to said movable clutch member, a second sleeve rotatively mounted on the first sleeve, circular flanges eccentrically surrounding and fixed to said second sleeve, means connecting said second sleeve to rotate with the driving shaft, a large, an intermediate, and a small gear wheel fixed together and rotatively surrounding said eccentric flanges, internal gear wheels rotatively mounted concentrically around said shaft and meshing with said large and intermediate gear wheels, means for locking said internal gear wheels against rotation, a third internal gear wheel fixed to and concentrically surrounding said first sleeve and meshing with said intermediate gear wheel, and means for moving said first sleeve axially upon the shaft thereby engaging and disengaging the members of the pair of clutches.

My invention will be more fully described hereinafter with reference to the accompanying drawings in which the same is illustrated as embodied in two convenient and practical forms, and in which,—

Figure 1 is a central sectional view; Fig. 2 a cross sectional view on line 2—2 Fig. 1; and Fig. 3 a central sectional view of a modified embodiment of my invention.

Reference letter A indicates a shaft which is rotated by any suitable power connections, such for instance as a direct connection with the engine of an automobile.

A' designates a fly wheel the hub a of which surrounds and is fixed to the shaft A.

a' designates a clutch member rigidly carried by the shaft and preferably formed integrally with the fly wheel A'.

B' designates a movable clutch member adapted to coöperate with the fixed clutch member a'. Clutch member B' concentrically surrounds and is fixed to an end of the sleeve B which constitutes a driven element. The clutch member B' is preferably formed integrally with the sleeve B and is engaged with and disengaged from the fixed clutch member a' by the axial movement of the sleeve upon the shaft A. A leather or other suitable wearing surface b' surrounds the movable clutch member to insure a tight engagement between the members of the clutch.

Rotatively mounted upon the sleeve B is a second sleeve C having a disk D projecting radially around the same and secured to the driving shaft A by suitable means, such for instance as screws d' extending through the same into engagement with the fly wheel A'. Circular flanges C' and C² are fixed to and eccentrically surround the sleeve C.

Rotatively surrounding the eccentric flanges C' and C² are three gear wheels, the smallest F², and intermediate F³ of which are preferably formed integrally, while the largest gear wheel G surrounds and is keyed to a flange F' formed integrally with the gear wheels F² and F³.

g indicates a key engaging the hub G' of the gear wheel G thereby locking the latter to the flange F' so that the three gear wheels are united to rotate together.

An internal gear wheel E' concentrically surrounds the shaft A and is provided with teeth e' which mesh with the teeth g' on the largest G of the three connected gear wheels. The internal gear wheel E' is supported by spokes E which carry at their inner ends a hub e rotatively surrounding the portion d of the sleeve C.

H² indicates an internal gear wheel concentrically surrounding the shaft A and having teeth which mesh with the teeth of the smallest F² of the three united gear wheels. The internal gear wheel H² is supported concentrically around the shaft by means of inwardly projecting webs or spokes H which carry at their outer ends laterally projecting flanges h², h' the former of which surrounds the flange e² carried by the internal gear wheel E', while the latter flange h' surrounds a flange k' carried by an internal gear wheel K³ the teeth of which mesh with the teeth of the gear wheel F³ which is the intermediate in size of the three united gear wheels.

The internal gear K³ is supported by a hub K² which surrounds and is locked to rotate with the driven sleeve B by any suitable means, such for instance as a key k². Surrounding the internal gear wheel K³ is a web K which carries the flange k', above described, and also carries a circular flange K'.

Any suitable means may be provided for locking the internal gear wheels E' and H² against rotation, such for instance as brake bands R⁴ and R³. A similar brake band R³ surrounds the circular flange K' carried by the internal gear wheel K³ which serves as a brake to retard or stop the rotation of the driven element B. The brake bands are of usual construction and may be operated to bind around the surrounding surfaces by any well known means (not shown).

Surrounding and fixed upon the sleeve B is a sprocket wheel L or other suitable power transmitting device by means of which rotary motion is communicated to the mechanism which is to be driven, such for instance as the rear axle of an automobile. A key l is shown as the means for non-rotatively securing the sprocket wheel upon the sleeve E'.

N indicates a disk concentrically surrounding the end of the sleeve B and secured thereon through a screw threaded engagement.

n designates a locking ring for securely retaining the disk N upon the end of the sleeve. Located adjacent to and surrounding the hub of the disk N is a yoke m connected to and preferably formed integrally with an oscillating lever M pivoted at m². Within the yoke m is a lining M' of tough metal spaced apart from the inner surface of the disk N to form a race-way in which are located ball bearings o.

m' designates a washer of tough metal located within the inwardly extending radial flange of the lining M' to assume the wear of the ball bearings. A pair of collars p' and p² surrounds the shaft A a short distance from the end of the sleeve B and form a race-way for balls o' interposed between the collars. Any suitable means may be provided for preventing the axial movement of the collar p² to the right, such for instance as a ring p fixed upon the shaft. Interposed between the disk N and the collar p' is a spring P the tension of which tends to move the sleeve B and thereby force the clutch B' into engagement with the coöperating fixed clutch member a'.

The operation of my invention is as follows: The shaft A is rotated through its connection with the motor and with it rotates the fly wheel A' and fixed clutch member a'. When it is desired to rotate the driven element B and with it the mechanism operatively connected to the sprocket wheel L at the same speed at which the shaft is rotated, the lever M is oscillated to the position shown in Fig. 1, thereby permitting the spring P to expand and move the sleeve B towards the left in Fig. 1 and force the movable clutch member B' into engagement with the fixed clutch member a'. When it is desired to disconnect the driven mechanism from the driving shaft A so as to permit the engine to run idly, the lever M is oscillated so as to partially compress the spring P and disengage the clutch member B' from the clutch member a'. When it is desired to rotate the driven element at a slower speed than that at which the driving shaft A rotates, the lever M is oscillated as above described to disengage the clutch member B' from the clutch member a'. The brake band R' is then caused to grip the internal gear wheel E' and prevent the rotation thereof. The eccentric flanges C' and C² rotate with the driving shaft A owing to the connection of the disk D with the fly wheel so that the three united gear wheels are caused to rotate within the respective surrounding internal gear wheels. As the number of teeth on the largest of the three united gear wheels is less than the number of teeth on the surrounding internal gear wheel E, during one rotation of the eccentrics with the driving shaft, the gear wheel G is in effect rotated in a reverse direction a distance corresponding to the difference in the number of teeth thereon and number of teeth on the surrounding internal gear wheel E'. As the gear wheel F³ is smaller than the gear wheel G the engagement of the teeth thereon with the teeth of the internal gear wheel K³ results in the latter being rotated in the same direction as the rotation of the driving shaft, but at a less speed. The rotation of the internal gear wheel K³ is directly communicated to the driven sleeve B and through the sprocket wheel L fixed thereon to the rear axle of the automobile or other mechanism to be driven. It is obvious that the reduction in speed imparted to the driven sleeve from the driving shaft is in proportion to the difference in sizes between the gear wheel G and F³. The nearer the same size these gear wheels are, the slower will be the speed imparted to the driven shaft. When it is desired to rotate the driven element in a reverse direction to that in which the driving shaft rotates, the clutch members are disengaged in the manner above described and the brake band R² caused to tightly engage the flange around the internal gear wheel H² so as to lock the latter against rotation. As the gear wheel F³ is larger than the gear wheel F² which engages the internal gear wheel H² it is obvious that the rotation of the eccentrics within the three united gear wheels will result in the internal gear wheel K³ being rotated in a direction reverse to that in which the driving shaft rotates so that the driven sleeve and the mechanism connected therewith will be reversely rotated. The ratio of the reverse rotation depends upon the difference in size between the gear wheels F² and F³, the greater difference in the size of said gear wheels resulting in greater reverse speed being imparted to the driven element.

It is obvious that in the embodiment of my invention above described and illustrated in Figs. 1 and 2, the eccentric flange will rotate and produce rotation of the surrounding united gear wheels within the internal gear wheels whenever the driving shaft rotates. If desired my invention may be embodied in the modified form shown in Fig. 3 in which the eccentric flanges will not rotate when the clutch members B' and a' are in engagement connecting the driven element directly to the driving element. This result is accomplished by providing a second pair of clutches one member of which A² is secured to the fly wheel and consequently rotates with the driving shaft, while the other member d² is carried by the sleeve C which also carries the eccentric flanges. In this embodiment of my invention in order that the driven element may be connected to the driving element through differential mechanism for reducing or reversing the speed, the lever M is oscillated so as to not only disconnect the clutch member B' from the clutch member a', but engage the clutch member d² with the clutch member A² of the second pair of clutches. After the members of the second clutch have been engaged as described, brake band R' or R² may be actuated as above described to communicate slow or reverse speed to the driven element. It is obvious that in this modification of my invention the transmission mechanism remains idle when the driven element is disconnected from the driving element and also when the driven element is directly connected to the driving element.

From the foregoing description it will be observed that I have invented an improved transmission gearing in which the driven element may be directly connected to the rotating power shaft, in which the driven element may also be connected to the power shaft through interposed speed reducing gearing, and in which the driven element may be driven in a reverse direction to that of the rotating shaft, such different movements of the driven element being easily effected by extremely simple mechanical means. It will be further evident that in my invention a plurality of united gear wheels are surrounded by internal gear wheels one of which is fixed to the driven element while the others are adapted to be held against rotation, the united gear wheels being brought into engagement with the surrounding internal gear wheels by means of eccentrics rotating with the driving element, the number of the united gear wheels and consequently the number of the internal gear wheels being determined by the number of different reduced speeds and number of different reverse speeds desired to be imparted to the driven element, it being evident that the reduced and reverse speeds are dependent upon the sizes of the gear wheels relatively to the gear wheel which coöperates with the internal gear wheel connected to the driven element.

Having now fully described my invention, what I claim as new and desire to secure by Letters Patent is:

1. In a power changing mechanism, the combination with a driving element, of a driven element, an eccentric rotated by the driving element, and means interposed between said eccentric and the driven element for rotating the latter in the direction of rotation of the driving element or in the opposite direction.

2. In a power changing mechanism, the combination with a driving element, of a driven element, an eccentric rotated by the driving element, and means interposed between said eccentric and said driven element for rotating the latter at less speed than and in the same direction as the driving element or in a reverse direction to the driving element.

3. In a power changing mechanism, the combination with a driving shaft, of a driven sleeve rotatably surrounding said shaft, an eccentric rotatively surrounding said sleeve, means for locking said eccentric to the driving shaft to rotate therewith, and power changing means interposed between said eccentric and said sleeve.

4. In a power changing mechanism, the combination with a driving shaft, of a driven sleeve rotatively surrounding said shaft, an eccentric rotatively surrounding said sleeve, means for locking said eccentric to the driving shaft to rotate therewith, and differential power changing means interposed between said eccentric and said sleeve for rotating the latter at less speed than or in a reverse direction to the driving shaft.

5. In a power changing mechanism, the combination with a driving element, of a driven element, an eccentric rotated by the driving element, differential power changing means interposed between said eccentric and the driven element, and means for rotating the driven element at the same speed as the driving element.

6. In a power changing mechanism, the combination with a driving shaft, of a driven sleeve rotatively surrounding said shaft, an eccentric rotatively surrounding said sleeve, means for locking said eccentric to the driving shaft to rotate therewith, power changing means interposed between said eccentric and said sleeve, a clutch member fixed to the driving shaft, a coöperating clutch member fixed to the driven sleeve, and means for moving said sleeve axially thereby engaging and disengaging said clutch members.

7. In a power changing mechanism, the combination with a driving element, of a driven element, an eccentric rotated by the driving element, a gear wheel rotatively surrounding said eccentric, an internal gear wheel surrounding and meshing with said gear wheel, means for operatively connecting said internal gear wheel with said driven element, a second gear wheel rotatively surrounding said eccentric smaller than and united to the first gear wheel, a second internal gear wheel surrounding said second gear wheel, and means for locking said second internal gear wheel against rotation.

8. In a power changing mechanism, the combination with a driving element, of a driven element, an eccentric rotated by the driving element, a gear wheel rotatively surrounding said eccentric, an internal gear wheel surrounding and meshing with said gear wheel, means for operatively connecting said internal gear wheel with said driven element, a second gear wheel rotatively surrounding said eccentric smaller than and united to the first gear wheel, a second internal gear wheel surrounding said second gear wheel, a third gear wheel rotatively surrounding said eccentric larger than and united to the first gear wheel, a third internal gear wheel surrounding and meshing with said third gear wheel, and means for separately locking said second and third internal gear wheels against rotation.

9. In a power changing mechanism, the combination with a driving shaft, of a driven sleeve rotatively surrounding said shaft, an eccentric rotatively surrounding said sleeve, means for locking said eccentric to the driving element to rotate therewith, a plurality of united gear wheels of different sizes rotatively surrounding said eccentric, internal gear wheels surrounding and meshing with said united gear wheels, means for operatively connecting one of said internal gear wheels with the driven element, and means for separately locking the other internal gear wheels against rotation.

10. In a power changing mechanism, the combination with a driving shaft, of a driven sleeve rotatively surrounding said shaft, an eccentric rotatively surrounding said sleeve, means for locking said eccentric to the driving element to rotate therewith, a plurality of united gear wheels of different sizes rotatively surrounding said eccentric, internal gear wheels surrounding and meshing with said united gear wheels, means for operatively connecting one of said internal gear wheels with the driven element, means for separately locking the other internal gear wheels against rotation, a clutch member fixed to the driving shaft, a coöperating clutch member fixed to the driven sleeve, and means for moving said sleeve axially thereby engaging and disengaging said clutch members.

11. In a power changing mechanism, the combination with a driving shaft, of a driven sleeve rotatively surrounding said shaft, a clutch member fixed to said shaft, a coöperating clutch member fixed to the driven sleeve, means for moving said sleeve axially to engage and disengage said clutch members, a second sleeve rotatively mounted upon said first sleeve, means for locking said second sleeve to rotate with the driving shaft, an eccentric surrounding and fixed to said second sleeve, a plurality of united gear wheels of different sizes rotatively surrounding said eccentric, internal gear wheels surrounding and meshing with said united gear wheels, means for supporting said internal gear wheels concentrically around said driven sleeve, means for operatively connecting one of said internal gear wheels with the driven sleeve, and means for separately locking the other internal gear wheels against rotation.

12. In a power changing mechanism, the combination with a driving shaft, of a driven shaft, three united gear wheels of different sizes located around said shaft, internal gear wheels surrounding and meshing with said united gear wheels, means for operatively connecting the intermediate sized one of said internal gear wheels with the driven element, means for separately locking the other internal gear wheels against rotation, and means actuated by the driving shaft for rotating said united gear wheels within the surrounding internal gear wheels.

13. In a power changing mechanism, the combination with a driving element of a driven element coaxial therewith, an eccentric rotated by the driving element, a plurality of loose internal gears concentric with said driving element, a plurality of pinions mounted concentrically with said eccentric and coöperating with said internal gears, and braking devices for controlling said internal gears, the parts being so proportioned and arranged that upon applying certain of said braking devices the driven element is rotated in the same direction as the driving element while upon applying other of said braking devices the driven element is rotated in the opposite direction relative to the driving element.

In testimony whereof, I sign this specification in the presence of two witnesses.

ROBERT SYMMONDS, Jr.

Witnesses:
J. W. De Cou,
L. B. Sawinsky.